(12) United States Patent  
Swenson, Jr. et al.

(10) Patent No.: US 9,373,015 B2
(45) Date of Patent: Jun. 21, 2016

(54) ASSET VERIFICATION AND TAGGING

(71) Applicants: Willard Eugene Swenson, Jr., Bloomfield Hills, MI (US); John Anthony Sabelli, Windsor (CA); Stephen Clifford Funtig, Tecumseh (CA)

(72) Inventors: Willard Eugene Swenson, Jr., Bloomfield Hills, MI (US); John Anthony Sabelli, Windsor (CA); Stephen Clifford Funtig, Tecumseh (CA)

(*) Notice: Subject to any disclaimer, the term of this patent is extended or adjusted under 35 U.S.C. 154(b) by 272 days.

(21) Appl. No.: 13/910,520

(22) Filed: Jun. 5, 2013

(65) Prior Publication Data

US 2013/0321129 A1    Dec. 5, 2013

Related U.S. Application Data

(60) Provisional application No. 61/655,611, filed on Jun. 5, 2012.

(51) Int. Cl.
*G06K 7/10* (2006.01)
*G06Q 10/08* (2012.01)
*G06Q 40/02* (2012.01)
*G06Q 40/00* (2012.01)
*G01S 19/14* (2010.01)
*G01S 5/02* (2010.01)

(52) U.S. Cl.
CPC ............ *G06K 7/10376* (2013.01); *G06Q 10/08* (2013.01); *G06Q 40/02* (2013.01); *G06Q 40/12* (2013.12); *G01S 5/02* (2013.01); *G01S 19/14* (2013.01)

(58) Field of Classification Search
CPC ..... G06Q 10/087; G06Q 10/08; G06Q 10/00; G06Q 20/20; G06Q 30/0601; G06Q 30/0267; G06Q 40/08; G06Q 40/02; G06Q 40/12; G06K 7/0008; G06K 2017/0045; G06K 7/10376; G01S 19/14; G01S 5/02
See application file for complete search history.

(56) References Cited

U.S. PATENT DOCUMENTS

| 6,366,206 | B1 * | 4/2002 | Ishikawa | G06K 19/077 340/572.1 |
| 7,123,149 | B2 | 10/2006 | Nowak et al. | |
| 7,336,181 | B2 | 2/2008 | Nowak et al. | |
| 7,841,513 | B1 * | 11/2010 | Katzer | G06Q 10/00 235/375 |

(Continued)

FOREIGN PATENT DOCUMENTS

WO    2010068980    6/2010

*Primary Examiner* — James Yang
(74) *Attorney, Agent, or Firm* — Carlson, Gaskey & Olds, P.C.

(57) ABSTRACT

A method for managing mobile assets includes initially certifying a physical existence and location of a mobile asset. The certifying includes receiving certification information about the location and data representing the physical existence of the mobile asset into a database. After certification, interrogation information is received into the database. The interrogation information includes read information from an electronically readable tag associated with the mobile asset, user-entered information about at least one of an instant location of the mobile asset and user-entered data representing the physical existence of the mobile asset, and geolocation information of the reader. At least one of the instant location and the user-entered data representing the physical existence of the mobile asset is validated by cross-referencing the certification information and the interrogation information to identify any discrepancies. The absence of discrepancies indicates a positive validation and the presence of any discrepancies indicates a negative validation.

14 Claims, 3 Drawing Sheets

(56) References Cited

U.S. PATENT DOCUMENTS

| | | |
|---|---|---|
| 8,256,381 B2 | 9/2012 | Pratt |
| 2008/0007409 A1* | 1/2008 | Ferry .................. B29C 43/222 340/572.1 |
| 2008/0128492 A1* | 6/2008 | Roth .................... G06Q 30/018 235/380 |
| 2012/0322380 A1 | 12/2012 | Nannarone et al. |
| 2013/0059534 A1 | 3/2013 | Sobalvarro et al. |

* cited by examiner

ASSET VERIFICATION AND TAGGING

CROSS-REFERENCE TO RELATED APPLICATION

This application claims priority to U.S. Provision Application No. 61/655,611, which was filed Jun. 5, 2012.

BACKGROUND

As part of the loan process, tools or other mobile or moveable assets may be pledged as security. A normal business practice of lending institutions is the regular verification of assets supporting loans. Furthermore, certain legislation, including the Sarbanes-Oxley Act and normal audit procedures, require the attestation that the financial statements present fairly the financial condition of the company. The knowledge of the existence and physical location of tools is thus critical to ensure proper reporting and compliance of federal, state and local tax rules and regulations.

Tool "tagging" allows for a low cost efficient tracking of tools used in a variety of industries, including automotive manufacturing processes. Current procedures to identify, locate and track tools at third party supplier locations are inadequate to properly identify all tools, their location and status on a regular and timely basis.

SUMMARY

A method for managing mobile assets according to an example of this disclosure includes initially certifying a physical existence and location of a mobile asset. The certifying includes receiving certification information about the location and data representing the physical existence of the mobile asset into a database. After certification, interrogation information is received into the database. The interrogation information includes read information from an electronically readable tag associated with the mobile asset, user-entered information about at least one of an instant location of the mobile asset and user-entered data representing the physical existence of the mobile asset, and geolocation information of the reader. At least one of the instant location and the user-entered data representing the physical existence of the mobile asset is validated by cross-referencing the certification information and the interrogation information to identify any discrepancies. The absence of discrepancies indicates a positive validation and the presence of any discrepancies indicates a negative validation.

In another aspect, a method for managing mobile assets according to an example of this disclosure includes initially certifying a physical existence and location of a mobile asset. The certifying includes collecting certification information about the location and data representing the physical existence of the mobile asset. The certification information is sent for inclusion into a database and the mobile asset is tagged with an electronically readable tag containing at least a portion of the certification information. After the certification, the electronically readable tag can be electronically interrogated with a reader to collect read information from the tag. User-entered information is input into the reader about at least one of an instant location of the mobile asset and user-entered data representing the physical existence of the mobile asset. The read information, the user-entered information and geolocation information of the reader, collectively interrogation information, is sent for inclusion into the database. At least one of the instant location and the user-entered data representing the physical existence of the mobile asset is then validated by cross-referencing the certification information and the interrogation information to identify any discrepancies. The absence of discrepancies indicates a positive validation and the presence of any discrepancies indicates a negative validation.

In another aspect, a method for managing mobile assets according to an example of this disclosure includes an initial certification of a physical existence and location of a mobile asset, including reception of certification information about the location and data representing the physical existence of the mobile asset into a database. After the initial certification, there is the reception of interrogation information into the database. The interrogation information includes read information from an electronically readable tag associated with the mobile asset, user-entered information, entered into a reader in association with the read information, about at least one of an instant location of the mobile asset and user-entered data representing the physical existence of the mobile asset, and geolocation information of the reader. There is then a validation of at least one of the instant location and the user-entered data representing the physical existence of the mobile asset by cross-reference of the certification information and the interrogation information to identify any discrepancies. The absence of discrepancies provides indication of a positive validation and the presence of any discrepancies provides indication of a negative validation.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
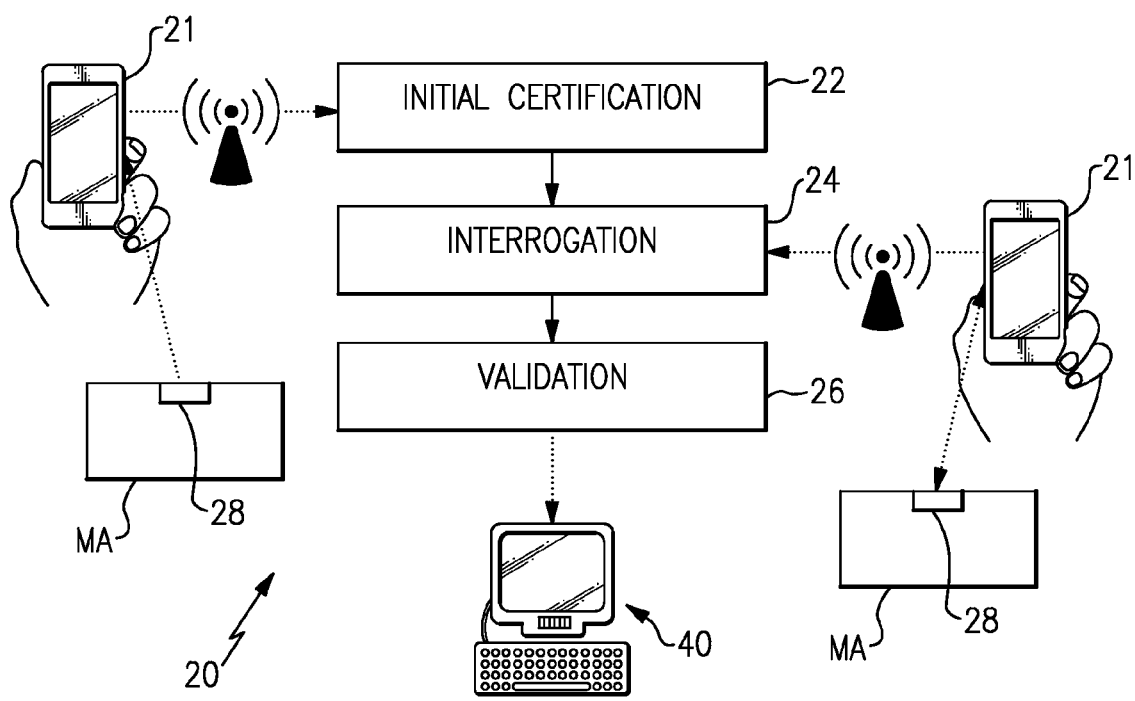
FIG. 1 illustrates an example method for managing mobile assets.

As discussed herein, tools or other mobile or moveable assets can be tagged using one or more of the disclosed tagging techniques and procedures, and their status can be tracked using an electronic reader, such as tablet, mobile computer, device known as a "smartphone," or other data encoder, which are herein used synonymously. For example, users can use information obtained and information residing on a database to make business decisions at the end of the tool's recommended tool manufacturing lifetime.

The automotive industry has grown substantially over the years to one where Original Equipment Manufacturers ("OEMs"), depend on the timely delivery of parts, produced on OEM tooling, from third party suppliers. Occasionally, OEM tooling resident at third party suppliers goes unaccounted for due to the closure or financial failure of the supplier. Tooling is defined as a piece of equipment which has direct involvement of the manufacture of parts. In those instances, the disruption of supply puts the OEM's production at risk. The possibility exists that significant financial impact will occur due to unaccounted tooling. Often due to the insolvency of a supplier, tooling is not identified as owned by an OEM and questions and concerns are raised as to the ownership of tooling.

Concern has been raised by OEMs of the possibility of the manipulation of the tool procurement process due to inadequate procedures resulting in the purchase and payment of tooling that is never built. In addition, tools which reach the end of manufacturing life, are often abandoned, discarded or scrapped with little regard to the residual value inherent in the tooling.

In order to improve the efficiency of the manufacturing process, meet the reporting requirements of the government loan covenants, improve financial reporting, monitor the location of tooling for tax purposes and to eliminate manipulation of the tooling process, recapturing the residual value of the tooling, certifying and verifying tooling through a combination of methods disclosed herein may be used.

Currently, most OEMs have policies regarding the tagging of tooling for the purposes of tool ownership. This is in contrast to capital tools which are used in the manufacture by holding indirect assisting of production. An example is a robot which is used in the assembly process. The robot is the capital component and the tool actually touching the part considered is considered tooling. The tagging of a tool or capital equipment is often conducted by way of a metal or plastic tag affixed by way of mechanical or adhesive fastener to the tool or capital tool.

One example policy can be that tool identification is to be made through a metal tag affixed in a permanent way to the tool not including glue, bolts or screws. The tag can include text on a metal or paper tag but can also incorporate radio tags embedded with critical information including, but not limited to, part numbers, drawings and tool composition and information that can also direct a user to a website or directory in which this information is maintained and potentially tracked.

A properly developed process of tool inventory gathers information allowing preparation of financial statements in accordance with generally accepted accounting principles as well as permit the management of the tools. The process should provide adequate stewardship over its resources through control and accountability of the tools. The system could allow for the monitoring of tool utilization and part production. An adequately developed process could allow for the above and permit the OEM to take advantage of the residual value in the tool in the form of recovery of metal value, tool reconditioning or refurbishment opportunities, or redeployment possibilities.

In order to comply with annual auditing or loan collateral procedures, some OEMs may send teams to the field to attempt to identify, estimate and verify tooling. This process is time consuming and expensive. It allows for the verification of only the tools which are counted at the specific time. In addition due to the expense, a full review at a point in time cannot be conducted. Suppliers compound the problem, by moving tools with or without approval to $2^{nd}$ and $3^{rd}$ level suppliers without notification to the OEM. The insolvency of the supplier compounds the problem with resulting loss of tooling.

Another side to tool building is suppliers not building tools in accordance with supplier instructions. In some cases this could amount to a mistake on the supplier's part or worse, fraud in charging for tooling never built or not built in accordance with specification. The physical verification can also eliminate the possibility of tools not being built to OEM's specifications.

There is therefore the opportunity to improve the information of tool verification using the disclosed technology and methodology, described below, which will provide timely and accurate reporting with which decisions, compliance and reporting can be made. To these ends, the following examples can be applied.

Although two-dimensional ("2D") systems use a variety of symbols, they are generally referred to as barcodes as well. Barcodes can be scanned, or read, by special optical scanners. Scanners or readers, and interpretive software, are available on devices such as desktop printers and smartphones to complete the task.

Barcodes can represent data by varying the widths and spacings of parallel lines, and may alternatively be referred to as linear or one-dimensional (1D). There are also rectangles, dots, hexagons and other geometric barcode patterns that utilize two dimensions, of which one example is a quick response code ("QR Code"). QR codes are rapidly readable and have a large storage capacity compared to UPC barcodes. QR Codes includes black modules arranged in a square pattern on a white background, but can also take other forms. In one example, the information encoded includes four standardized kinds ("modes") of data (e.g., numeric, alphanumeric, byte/binary, Kanji), but can alternately include additional or other kinds of data. The system herein can utilize the large amount of data stored on the QR Code in conjunction with other media for means of inventory management.

Radio-frequency devices, such as RFID, utilize a wireless, non-contact radio system to transfer data from a tag attached to an object, such as a tool, for the purposes of automatic identification and tracking. Some tags require no battery and are powered by the radio waves used to read them, known as passive RFID. Others use a local power source and are known as active RFID. The tag contains electronically stored information which can be read from up to several meters (yards) away.

Near field communication (NFC) is a set of standards for smartphones and similar devices to establish radio communication with each other by touching them together or bringing them into close proximity, usually no more than a few centimetres. Communication is also possible between an NFC device and an unpowered NFC chip, called a "tag".

A Global Positioning System (GPS) is a space-based satellite navigation system that provides location and time information in all weather, anywhere on or near the Earth, where there is an unobstructed line of sight to four or more GPS satellites. GPS can be problematic when tools are moved in and out of buildings thereby cutting access to the satellite.

A "smartphone" is a high-end mobile phone built on a mobile computing platform, with more advanced computing ability and connectivity than a feature phone. The first smartphones were devices that mainly combined the functions of a personal digital assistant (PDA) and a mobile phone or camera phone. Smartphones also serve to combine the functions of portable media players, compact digital cameras, pocket video cameras, near field communicators and GPS navigation units. Modern smartphones typically also include high-resolution touchscreens, web browsers that can access and properly display standard web pages rather than just mobile-optimized sites, and high-speed data access via Wi-Fi and mobile broadband. Tablets and other mobile data encoding devices may similarly include touchscreens and web browsers.

A lapse in regular physical verification, the numerous locations which tools are distributed over and the conditions in which tools are located in all hamper the process of physically identifying and verifying tools or other mobile assets. Compounding this is the cost to physically verify the tools on a timely and recurring basis. It is to be understood that the examples herein may be presented in the context of a manufacturing tool or manufacturing tools, but that the examples are applicable to other mobile assets. Mobile assets are machines, equipment or the like that can or do move over their lifetime.

With the above understanding, individually or in combination, tools can be physically identified, verified and tagged for confirmation of location and existence review and testing by third party or otherwise.

There is a cost to physically verifying the tools on a regular basis. This cost, in part, is the reason why the tools, by the OEMs, are traditionally not reviewed on a regular basis. Some of the OEMs conduct limited counting on physical basis. Unfortunately once counted the tools could be moved and to verify the tools, they would have to be counted again. The examples herein allow the reading of tags, proving the physical existence and location of tools.

The methodology and software applications herein will address a number of the issues raised above. A disclosed process and methodology offers a way for OEMs or other users to offset a fraction or all of the cost of the physical inventorying of tools. There are a number of distinct processes which occur in the life of a tool from an inventory point of view (e.g., see FIG. 4). First there is the initial design and creation of a tool. It is at this point where the initial certification of a tool can occur while the tool is being finalized and assessed by the tool builder and the OEM. It is at this point that a user can "certify" a location and physical existence of tool. A tagging team can attend the tool builder site where OEM tools are located. Physical identification and certification of the tools to OEM records, such as a database, is made. Affixing a tag to the tool using appropriate adhering methodology is done along with confirming the geolocation of the tool. An exemplary application uses a smartphone or other data encoding device to run through a series of inquiries concerning the tool, including but not limited to the physical location of the tool by entering the location data, the material comprising the tool, the weight, ancillary equipment as well as a time-stamped photograph. This information is uploaded into a system or database which would contain the information about the tool. The certification can be conducted using a data encoding device and software that is developed to prompt a user to enter such information. OEMs can amend their supplier policies to require suppliers to verify the location of tools should they be moved and to require suppliers to verify the location on a periodic basis.

The tool tag may include multiple identification methods, or distinct electronically readable media. The first can be a matrix barcode or QR Code because of the amount of information that can be contained in the code. The near universal availability of matrix barcode readers allows suppliers to gain a certain level of information about the tool. The next can be a radio frequency device, such as a Near Field Communication tag or a passive RFID tag. The Near Field Communication tag avoids costly readers and other infrastructure and avoids the need for internal power sources. Most smartphones or other data encoders currently can be, or already have, capability to read tags and provide GPS or Geo-location information. The term "geolocation" or variations thereof refers to information representing the real-world geographic location of an object, such as a reader (data encoder), and can have the form of geographic coordinates, a physical address or combination thereof, for example.

Another method to monitor RFID tags is in the form of fixed antennas, computer software to monitor or mobile antennas and handheld readers are used. Given the physical distribution of OEM tools, it may not be feasible to implement a system in every location containing tooling. As an example, a passive or active RFID tag can range from $10 to $100 per tag. Should an infrastructure be installed at the location where tools are located, equipment required to monitor the tools can range from $2,000 for a handheld reader to $75,000 for fixed antennas and software. This does not include the requirement for personnel training to operate the equipment or the possibility of damage to the portable readers or upgrades. Active and passive RFID tags can also provide information, not only on the location, but also on movement, environment, cycles and a number of other factors. The readers of the RFID tags can be unique devices and can be costly or limiting the user to a particular software or tag. For these reasons, installing antennas and other fixed infrastructure devises may not be cost effective.

GPS tags may have limited readability due to the need for line of sight to GPS satellites. In certain circumstances and conditions, GPS tags can provide real time information on the physical location of the tool tagged with GPS. In most instances, tools are physically located within buildings thereby limiting the readability of the tags. For this reason, the use of GPS technology has niche applications in the automotive tooling sector. One way to solve this is through Wifi utilization for generalized GPS location.

Once tools are tagged "certified", tools can be transferred to a production facility. Inherent in the automotive industry, OEMs and suppliers are looking to improve margins and reduce costs by seeking suppliers who can produce parts at a lower cost. In these situations, suppliers sometimes move tools to other suppliers with or without the permission of the OEM who own the cools. Occasionally, the suppliers may cease to operate due to a plant shutdown, or the insolvency of the supplier. In these situations, tools may be lost. In a disclosed example method, tools can be inventoried on a periodic basis for a nominal cost.

Training can be held for the continual monitoring or "verification" by suppliers. Using the process herein, upgrades can be downloaded or made available and a low cost system for reading tags can be employed. By engaging the supplier base and using a multi-tag system which can include matrix barcodes, (2D) bar codes (1D) passive RFID or NFC tags capable of being read by a smartphone or other data encoder, this will provide many options to read the information. The smartphone is readily available and has the capacity to receive and process GPS signals as well as triangulate its position using cell tower signals also known as Geo-locate. Also, many smartphones have built in cameras and capabilities of RFID readers including location determination, RFID, NFC or QR Code readability. These also have sufficient memory to store information and the ability to access to internet. Identification and authentication of the "verifier" can be stored and uploaded to a system to provide a record of the verification as well as providing rights to the verifier to conduct or access the system. Additionally, the use of a smartphone provides the ability to remotely certify and verify a fixed asset inventory using, but not limited to, a variety of tracking technologies.

Costs inherent in such a system include the physical cost of the tags, attendance to inventory the tools, application development, travel, system maintenance, and annual inventorying. Considering OEMs have a supplier base of thousands of suppliers in tens of thousands of locations, the annual cost would be enormous. Utilizing annual physical verification is prohibitive, installing or providing suppliers with current technology in the form of readers or GPS tags and readers would be cost prohibitive. An initial certification can be conducted; annually the supplier would verify the tools location using an application disclosed herein. This approach reduces travel time, smartphone are readily available and the suppliers are already at their location. The verifying or updating inventory records can be done efficiently and as often as mandated by the OEMs.

Significant value is lost each year by the OEMs when tools are finished their production or service life and are scrapped. Accordingly, an example method utilizes the information captured during the certification process to assist the OEMs in recouping part of their investment. Often tools weigh thousands of pounds and are made of high quality steels and alloys and also have ancillary equipment some or all of which can be reconditioned or refurbished. By taking advantage of the price of metals, proper verification and scrapping of tools for their mass of metal can be used to guarantee deliveries of steel or other raw materials, proper inventory management for the potential use of carbon credits upon retirement or recycling of steel or raw materials.

The typical life of automotive OEM tooling begins with design of tooling. Once a design is approved the tool is built by a tool supplier and once constructed the tool is approved for production. In most cases, part production is carried out at the OEM's location or an approved production part supplier. Many times the need to reduce costs results in tooling being moved from primary suppliers to secondary or third level suppliers with or without the approval of the OEM.

Production is carried out typically for a period of 3 to 4 years afterwards, the tools are moved into service production for 9 to 10 years. At the end of life, OEMs contact the supplier where the tools are residing and direct the supplier to scrap or redeploy the tools. In most cases the former than the latter.

The above timelines are incorporated with other features into the process and permit the OEMs to gain knowledge, information and security into their tooling. Initially, a user attends the tool builder site, in the case of new tools, and "certifies" the tools using the application described above. By utilizing the smartphone, information of the tool, tool number, material, size weight, location, time-stamped picture can be gathered and uploaded into a system. At this first instance, the certifier, acting on behalf of the OEMs, can attest to the tool, identification, physical existence and location.

In situations where the tool currently exists, also known as legacy tooling, to the certifier attends the location where the tools reside and conducts the initial certification. Certification in both instances is conducted by the physical review of the tool and attaching a tag containing a QR code, NFC tag and visual information as to ownership and tool ID as well as part information.

Part suppliers can be trained on the scanning procedures so that periodically, when requested by the OEMs, the supplier can conduct the verification or scan the tool tag.

As mentioned, on a periodic basis, OEMs will want to update their tool records. Currently this is a cost prohibitive process and needs to be done regularly. The difficulty is that not all tools are reviewed or inventoried at the same time. Through the initial or legacy certification, the regular verification, in time, all tools can be tagged and can be inventoried. Anomalies in the system can be investigated by the user or the OEMs and the integrity of the database can be checked through periodic visits.

Importantly, the significant costs of conducting an inventory of the tools is reduced by utilizing the staff at the suppliers thereby eliminating travel costs and a using the smartphone reader herein which eliminates the need for significant infrastructure costs.

The processes and collection of information in a database allows reports to be generated at the user's prompting, which will identify tooling that is reaching the end of its life. This information is important in that the residual value of tools could be reclaimed by salvage, reclamation, refurbishment or redeployment. Often OEMs may redeploy a particular vehicle to another market and the time to identify the location of tooling is important. The cost of a misplaced tool for a redeployed vehicle is believed to be the cost of new tools, hence the value of a disclosed system in having timely, up to date information is high. Another benefit of the system is that after the deployment, the final end of life decision can be made and value of residual metals captured.

There is a benefit to the OEMs in being able to identify the reduction in the carbon footprint by recycling the metals and reusing or refurbishing the tools. Using information in the database will allow OEMs to apply for carbon credits.

For system design the ability to centrally design, upgrade and distribute the programming required for system entries for inventory management is desirable. This approach utilizes the use of a certification and a verification applications (i.e., "Apps") distributed to smartphones rather than using dedicated readers, antennas and other infrastructure. The use is believed to save a substantial amount of money per site.

The use of matrix barcodes or QR codes provides users or readers with approximately 4,000 characters of text. Information such as but not limited to ownership, tool number, part number, tool maker can be stored on the matrix barcode. This tag would be complimentary to other tags and information on the tool. Matrix barcodes are readily readable by smartphones. Additionally for redundancy purposes, similar information stored in a bar code RFID or NFC tag can also be added to the tool.

Adding and complimentary to the above tags would be a passive RFID tag which is readable by a smartphone using Near Field Communication.

Another indicator of ownership would be descriptive narrative of the tool ownership, the tool number as well as a visual button representing the owner. In one example, an apparatus, process, method or combination thereof ("a system")(see figure below) utilizes GPS and/or geo-location capabilities of a smartphone to identify where a user is logging in. The user registers into the system using a user name and cell number scanning tools. Using the photo capability of the smartphone, a time-stamped photo is taken of the person conducting the inventory, as well as the methodology of certifying tooling on an initial basis by the certifier and following periods of verifying the tools by way of a verification application by the supplier. Additionally, the information obtained through the certification process and updated by verification can be used in whole or in part to develop strategies to recover the tool value at the end of its tool life by developing salvage, reconditioning and refurbishment techniques.

FIG. 1 schematically illustrates an example method 20 for managing mobile assets, represented at "MA." In this example, the method 20 can be embodied, at least in part, in three sections, actions or steps, which include an initial certification 22, an interrogation 24 and a validation 26. Further, in this example, the method 20 is carried out by use of one or more portable, electronic readers 21 that are capable of reading or interrogating an electronically readable tag 28 secured on the mobile asset. The electronically readable tag 28 may also be considered to be an Asset Management Identifier ("AMI™").

In this example, the method 20 includes initially certifying a location and physical existence of the mobile asset. It is to be understood that although the examples may refer to a singular mobile asset, the examples are applicable to groups of assets. The initial certification 22 includes receiving certification information about the location of the mobile asset and data representing the physical existence of the mobile asset into a database. As an example, the certification information can include information about the model number, the size, the weight, and a time-stamped picture of the actual mobile asset. The certification information can be collected using the electronic reader 21 by entering the information into software adapted to input such information. The certification information may further include a user ID, an ID associated with the mobile asset, one or more ID's associated with an electronically readable tag associated with the mobile asset and other information as may be desired or appropriate based on the type of mobile asset. The certification information can be transmitted from the electronic reader directly into the database or into a remote intermediate memory from which the information is entered into the database. The information can be transmitted using a wired or wireless connection, such as WiFi.

At a time after the initial certification 22, the mobile asset can be interrogated to collect interrogation information. The interrogation information is also received into the database and includes read information from the electronically readable tag 28 associated with the mobile asset, user-entered information, entered into the reader in association with the read information, about at least one of the instant location of the mobile asset and user-entered data representing the physical existence of the mobile asset, and geolocation information of the reader 21. Geolocation information can be the actual geographic location of the reader 21, or information from which the actual geographic location can be determined.

Figure 2:
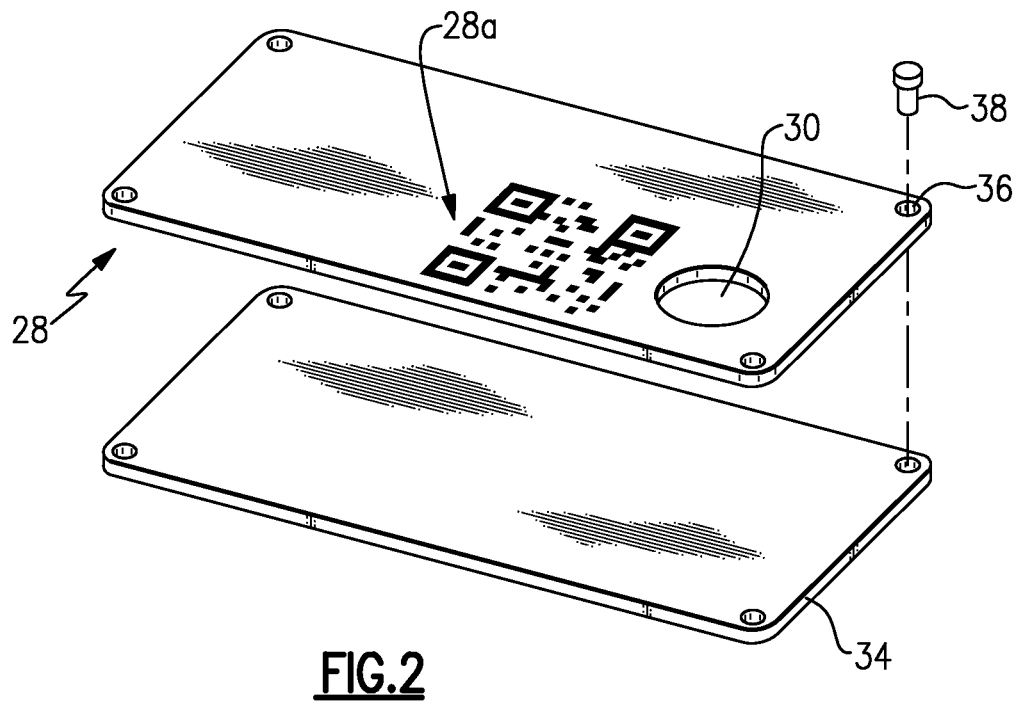
FIG. 2 illustrates an example electronically readable tag.
Figure 3:
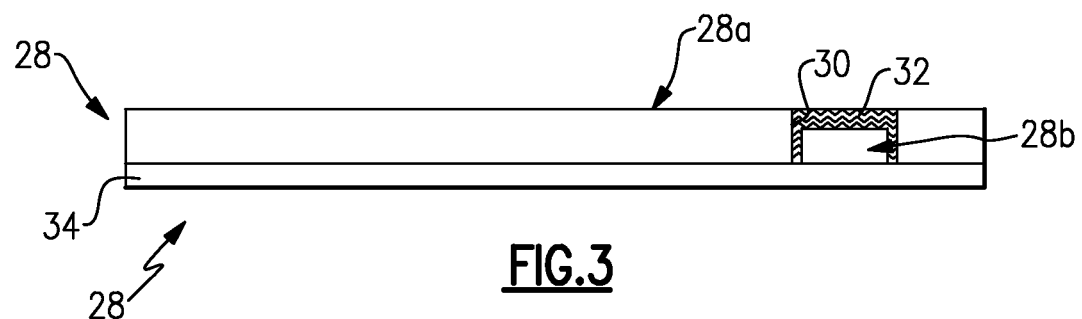
FIG. 3 illustrates a cross-sectional view of an electronically readable tag.

In a further example of the interrogation 24, a user can electronically interrogate the electronically readable tag 28 with the reader 21 to collect the read information from the electronically readable tag 28. As shown for example in FIGS. 2 and 3, the electronically readable tag 28 can include a first electronically readable media 28a and a second electronically readable media 28b, which can also provide a level of redundancy. In the example shown, the first electronically readable media 28a is a two-dimensional code that is engraved or printed on the surface of the electronically readable tag 28.

The electronically readable tag 28 includes an opening 30 in which the second electronically readable media 28b is embedded. For example, the second electronically readable media 28b is a radio frequency device (e.g., RFID) that is encapsulated within the opening 30 and at least partially surrounded with a potting material 32, such as epoxy. The electronically readable tag 28 either includes or is provided with an adhesive layer 34 for securing the electronically readable tag 28 to the mobile asset. Further, the electronically readable tag 28 can include additional openings or areas 36 for receiving permanent fasteners 38 to permanently affix the electronically readable tag 28 to the mobile asset. As an example, the permanent fasteners 38 are rivets that permanently physically deform to secure the electronically readable tag 28 to the mobile asset. Additionally or alternatively, the electronically readable tag 28 can be chemically and/or metallurgically bonded with the mobile asset, to ensure that the electronically readable tag 28 is not easily removed or tampered with.

The encapsulation of the second electronically readable media 28b protects against tampering and provides another level of redundancy. For instance, if the electronically readable tag 28 were to be illicitly removed from the mobile asset by prying or otherwise removing the plate portion of the tag 28, the second electronically readable media 28b would become separated from the plate portion of the tag 28 that has the first electronically readable media 28b. Thus, a future user interrogating a separated tag 28 would interrogate only one or the other of the electronically readable media 28a/28b and, thus, information from only one or the other of the electronically readable media 28a/28b would be transmitted to and received into the database, which can be used as a cross-reference in the validation 26, i.e., a negative validation in response to receiving or detecting only one or the other information of the electronically readable media 28a/28b.

Electronic interrogation of the electronically readable tag 28 includes reading each of the two electronically readable media 28a/28b. For example, the first electronically readable media 28a can include at least a portion of the certification information identifying the mobile asset. The second electronically readable media 28b can include a link address to the database.

The user also inputs user-entered information into the reader 21 either before, during or after the electronic interrogation. The user-entered information includes information about at least one of an instant location of the mobile asset (i.e., location where the user is conducting the interrogation) and user-entered data representing the physical existence of the mobile asset. For example, the instant location of the mobile asset may be an address of the business or place where the interrogation is being conducted. The user-entered data representing the physical existence of the mobile asset can be a time-stamped picture of the mobile asset that is being interrogated. The read information from the electronically readable tag 28, the user-entered information and geolocation information of the reader 21, collectively interrogation information, are then sent for inclusion into the database. The transmittance of this information can be by wired or wireless connection.

The instant location and/or the user-entered data representing the physical existence of the mobile asset is then validated by cross-referencing the certification information and the interrogation information. The cross-referencing identifies any discrepancies between the certification information and the interrogation information and provides a redundancy for validating the interrogation information. The absence of discrepancies can indicate a positive validation, and the presence of any discrepancies can indicate a negative validation. The cross-referencing can be manual, computerized or a combination thereof. The validation result can then be displayed on electronic display 40 (FIG. 1), although the display can alternatively, or also, include other non-electronic displays in the form of printed reports or the like. Additionally, an electronic portal can be provide to permit access of the certification information, the interrogation information or combinations thereof to remote users to view such information and generate reports as may be needed.

Figure 4:
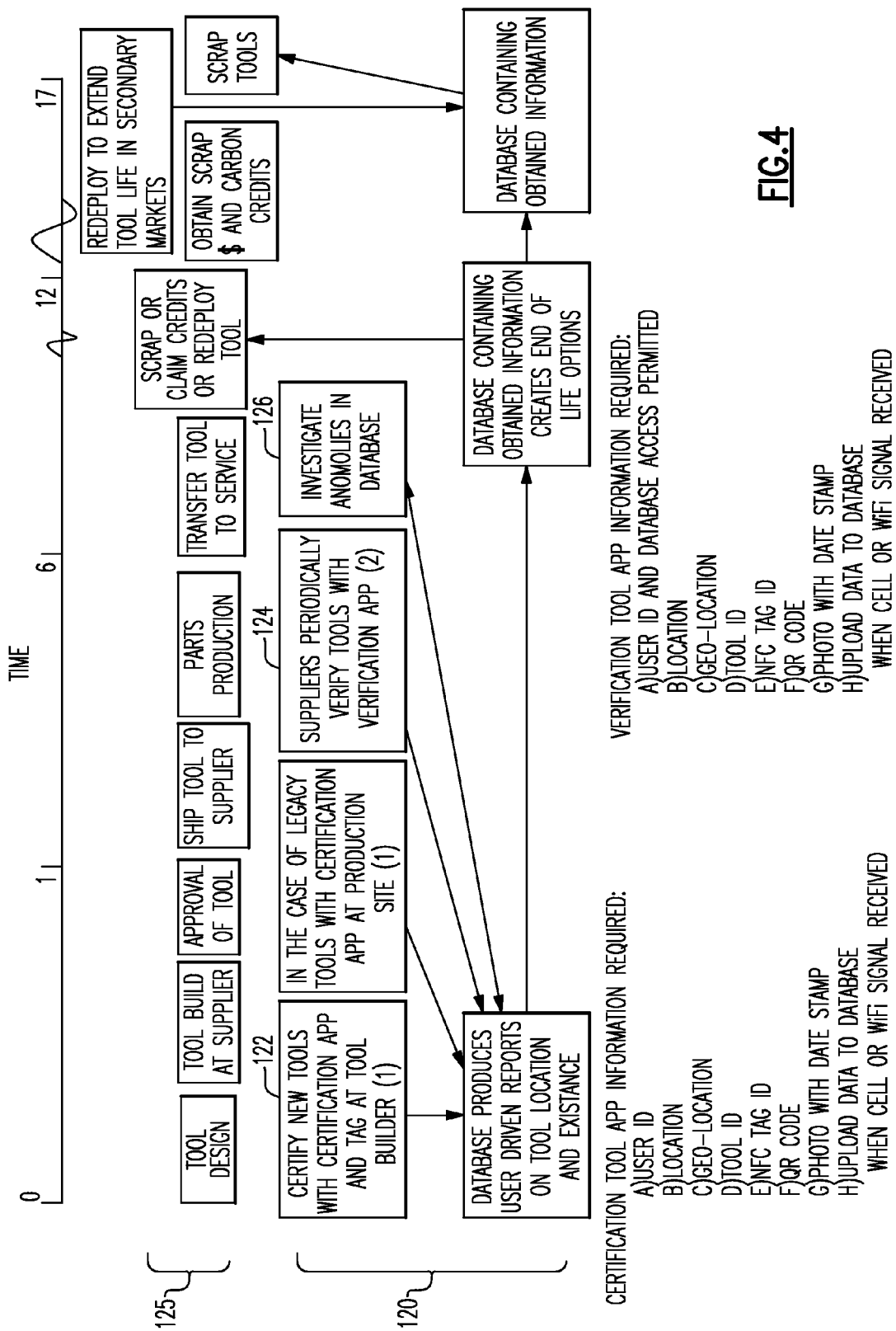
FIG. 4 illustrates another example method for managing mobile assets.

FIG. 4 illustrates another example method 120 of managing mobile assets, where like reference numerals with the addition of one-hundred are used to indicate like elements where appropriate. In this example, the method 120 is represented on a time scale, such as in years over the life, represented at 125, of a mobile asset. The life 125 of the mobile asset can include the mobile asset design all the way up to use and eventual scrapping of the mobile asset. In this example, the method 120 is used to track the mobile asset through its life 125 and facilitate decision making in the management of the mobile asset. In this example, the mobile asset is initially certified at 122 using a "certification application." The certification can also include certifying legacy tools that are already in existence but not yet entered into a database. The certification information is input into a database, from which a user can generate reports on the location of such tools. At interrogation 124, a supplier can periodically interrogate the electronically readable tag of the mobile asset with a "verification application." At validation 126, discrepancies or anomalies between the information collected at 124 and the information collected at 122 can be cross-referenced. Reports or displays of such anomalies or lack thereof can then be generated and sent to users or provided through electronic portals to users. The mobile asset can thus be tracked throughout its life and the database information can be used to develop, maximize or optimize operational, logistical, salvage, reconditioning and refurbishing techniques. Additionally, near the end of the life 125 of the mobile asset, there is a complete database of information related to the mobile asset and decisions based upon the information can be made to scrap or otherwise utilize the mobile asset from that point.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for managing a tool, the method comprising:
   initially certifying a physical existence and location of a tool, wherein the tool is a piece of equipment having direct involvement in the manufacture of machine parts, including:
      collecting certification information about the location of the tool and data representing the physical existence of the tool,
      sending the certification information for inclusion into a database, and
      permanently fastening an electronically readable tag to the tool using fasteners that permanently physically deform during the fastening, the electronically readable tag comprising opposing first and second faces, a first electronically readable media situated on the first face, and a distinct second electronically readable media embedded within the electronically readable tag, the first and second electronically readable media containing at least a portion of the certification information;
   at a time after the initial certification:
      collecting read information from the electronically readable tag, the collecting read information comprising:
         electronically interrogating the first electronically readable media using a reader, and
         electronically interrogating the second electronically readable media using the same or another reader,
      inputting user-entered information into the reader regarding at least one of an instant location of the tool and user-entered data representing the physical existence of the tool, and
      sending the read information, the user-entered information, geolocation information of the reader, collectively interrogation information, for inclusion into the database; and
   validating at least one of the instant location of the tool and the user-entered data representing the physical existence of the tool by cross-referencing the certification information and the interrogation information to identify any discrepancies, the absence of discrepancies indicating a positive validation and the presence of any discrepancies indicating a negative validation.

2. The method as recited in claim 1, wherein the user-entered data representing the physical existence of the tool includes a time-stamped picture of the tool.

3. The method as recited in claim 1, wherein the cross-referencing includes comparing the location of the tool of the certification information and at least one of the user-entered instant location of the tool and the geolocation information of the reader.

4. The method as recited in claim 1, including validating both the instant location of the tool and the user-entered data representing the physical existence of the tool.

5. The method as recited in claim 1, further comprising providing an electronic portal for a user to access the interrogation information.

6. The method as recited in claim 5, further comprising providing the electronic portal for the user to access the certification information.

7. The method as recited in claim 1, wherein one of the two distinct electronically readable media is read to obtain a link address to the database and the other of the two distinct electronically readable media is read to obtain at least a portion of the interrogation information.

8. The method as recited in claim 1, further comprising displaying either the positive validation or the negative validation.

9. The method as recited in claim 1, wherein the first electronically readable media comprises a two-dimensional code and the second electronically readable media comprises a radio frequency device.

10. The method as recited in claim 1, including generating the negative validation in response to a discrepancy between the geolocation information and the user-entered instant location of the tool.

11. The method as recited in claim 9, wherein the two-dimensional code is engraved or painted onto the first face of the electronically readable tag.

12. The method as recited in claim 1, wherein said permanently fastening the electronically readable tag to the tool comprises using a plurality of rivets to permanently fasten the electronically readable tag to the tool.

13. The method as recited in claim 1, wherein said permanently fastening the electronically readable tag to the tool further comprises metallurgically bonding the electronically readable tag to the tool.

14. The method as recited in claim 1, wherein said validating comprises indicating a negative validation in response to either the electronic interrogation of the first electronically readable media or the electronic interrogation of the second electronically readable media failing.

* * * * *